Patented Sept. 7, 1937

2,092,502

UNITED STATES PATENT OFFICE 2,092,502

UREA RESIN TYPE ARTICLE AND METHOD OF MAKING SAME

Carleton Ellis, Montclair, N. J., assignor to Ellis-Foster Company, a corporation of New Jersey No Drawing. Application February 5, 1930, Serial No. 426,192

11 Claims. (Cl. 154—2)

This invention relates to resinous products derived by aldehydic condensation of urea and/or thiourea and/or other resinifying urea derivatives and the cellulose complex thereof.

The object of the invention is to provide a complex adapted for use in the plastic arts.

The complex may be considered from two standpoints: (1) as a primary complex; and (2) as a secondary complex.

The primary complex is constituted by either (a) urea aldehyde condensation products, particularly such products derived with the aid of formaldehyde; or (b) such products incorporated with a modifying agent of resinification, such as the condensation products of thiourea and an aldehyde, specifically formaldehyde, or a resinous material of the type of an acetone resin made by reacting on acetone with an aldehyde such as formaldehyde or various other resinous modifying agents, as will subsequently be more fully described.

In specification Serial No. 689,165, filed January 28, 1924, entitled "White synthetic resin and process of making same" there is described and particularly claimed the production of urea-formaldehyde types of condensation products in which acids including organic and mineral acids are employed in at least one stage of the condensation, as well as the production of condensation products from urea and formaldehyde under super-atmospheric pressure.

In specification Serial No. 735,600, filed April 13, 1929, entitled "Urea product", now Patent No. 2,057,672, there is described and claimed laminated products particularly of mica material and molded mica products in which urea-formaldehyde type resins including urea-thiourea formaldehyde type resins are employed as bonding agent.

In specification Serial No. 742,719, filed October 9, 1924, entitled "Laminated pressboard and multi-colored articles and process of making same", (this application now being abandoned), there was described a production of laminated products produced from paper, paper board, etc. the bonding agent being a synthetic resin particularly of the urea-formaldehyde type.

In application Serial No. 28,505, filed May 6, 1925, entitled "Synthetic resin and process of making same", now Patent No. 1,846,853, there is particularly described and claimed the heat and pressure consolidation products of urea and formaldehyde and methods of making such products.

In application Serial No. 323,215, filed December 1, 1928, entitled "Resinous condensation products", now Patent No. 1,897,978, there is particularly described and claimed urea-formaldehyde type condensation products produced with resinifying sulphur-containing compounds including, for example, thiourea in the production of composite materials and heat treated products therefrom.

In application Serial No. 331,727, filed January 10, 1929, entitled "Resinous substances", now Patent No. 2,009,986, there is particularly described and claimed resinous condensation products of the urea-formaldehyde type produced with organic sulphur-containing substances, such as thiourea and the methods of making such condensation products, for example, of the urea-thiourea-formaldehyde type.

In application Serial No. 356,878, filed April 20, 1929, entitled "Urea and/or urea derivative plastic and process of making same", now Patent No. 2,009,545, there is particularly described and claimed molding compositions including urea aldehyde condensation products and synthetic resins incorporated therewith and molded products produced therefrom including particularly dishes produced with such condensation products of the urea-formaldehyde type and cellulose fillers.

In application Serial No. 371,307, filed June 15, 1929, entitled "Resinous complexes and compositions of synthetic origin containing sulphur and process of making same", now Patent No. 2,011,573, there is described and claimed condensation products produced from urea and ammonium thiocyanate or urea, thiourea and ammonium thiocyanate with formaldehyde.

In application Serial No. 407,292, filed November 14, 1929, entitled "Transparent tissue and process of making same", now Patent No. 2,029,525, there is particularly described and claimed paper such as glassine paper carrying urea aldehyde resins both with and without other plasticizing agents.

In one modification of the present invention urea condensation products in conjunction with sulphur-containing resins are used together to form the basis of a plastic or resinous complex. In Serial 735,600 now Patent No. 2,057,672, I have discussed the employment of mixtures of urea and thiourea reacted with formaldehyde to form a plastic complex. In the last mentioned application I have also indicated that the reaction between these urea materials and the aldehyde can be carried out in acid, alkaline or neutral solution. The present invention is in part concerned with production of an initial reaction product under conditions which are substantially neutral, such, for example, as are indicated in Serial No. 415,873.

*Reaction within the confines of neutrality.*—Reaction within the neutral zone, that is in that borderline between acidity and alkalinity, has in years past been determined by various indicators such as litmus. In my earlier applications where reference has been made to the conduct of the initial reaction under conditions of neutrality, I have made such determinations of neutrality by means of litmus, and the like. In recent years the hydrogen ion concentration method of determining acidity, alkalinity and neutrality has come into use with the provision of delicately adjusted indicators to make possible more accurate determinations than heretofore available with the aid of litmus and the like. According to authorities, litmus indicates neutrality between a pH of 4 or 5 on the one hand (acid side) and a pH of 8 on the other hand (alkaline side). Within these limits there exists what may be termed a neutral zone defining neutrality as originally expressed in terms of litmus or similar indicators. In the present invention I prefer to conduct the initial reaction between formaldehyde and urea and/or thiourea, etc., within the limits of such neutral zone. If the formalin solution employed is not adequately neutral it may be suitably neutralized to bring it within this neutral zone.

*Period of heating.*—Reaction between the urea materials and the formalin may be carried out at elevated temperatures but below the boiling point of the liquid, as indicated in several of my earlier applications. Or a definite temperature of reaction, namely, the boiling point may be taken and the time of heating reckoned on that temperature. Within the neutral zone the reaction takes place with a sufficient degree of rapidity at the boiling point (which is usually a degree or two below 100° C.) permitting a syrupy product to be prepared by conducting the reaction for periods ranging from 15 minutes to 2 or 3 hours. Considered from the standpoint of pH the time of reaction may be stated in a very rough way to vary inversely as the hydrogen ion concentration increases. During the heating there is usually a very slight increase in pH value. A reaction mixture which in the cold showed a pH of 6, after 30 minutes boiling showed a pH of 5.3, after 1 hour pH 5.2 and after 1½ hours pH 5.1. At this stage the reaction mixture gelled. In another observation a batch having an initial pH of 5.6 showed pH 5.1 at the end of half an hour. The change in pH by heating, therefore, is very slight and apparently does not at any time carry the reaction mixture out of the neutral zone when the reaction has been initiated under said neutral conditions. Therefore operating under these conditions I may start with an initial pH ranging from 7½ or 8 down to 4 without sacrificing that condition of neutrality expressed, for example, in Serial No. 735,600. Preferably the reaction is carried out at atmospheric pressure employing a reflux condenser which substantially prevents the admission of air during the reaction. In other cases reaction may be carried out in autoclaves at pressures above atmospheric.

*Relation of heating to drying.*—The time of heating is in some manner connected with the release of moisture from the resinified material during the drying period. Certain conditions are imposed with respect to drying temperatures in order to prevent conversion of the material during drying to a stage where it will not flow properly in the mold. It is of great importance to avoid this precuring condition because for molding purposes a composition must be prepared which will soften and flow freely to all parts of the mold forming sharp edges or otherwise taking a clean-cut impression of the mold and thereupon to set promptly, that is cure, yielding a hard thermo-set shaped article. As will be subsequently more fully discussed, a material of the cellulose type preferably is incorporated with the resin, especially while the latter is in its intermediate syrupy stages. Thereupon the material is dried. This may be conducted, as I have specified in certain of my patent applications, in a vacuum dryer. A procedure which allows the employment of cheaper equipment is drying in the open as, for example, air drying followed by exposure to a gentle heat. A simple manner of drying is to expose the composition on screens made from nickel or Monel metal wire placed in a drying room through which a circulation of air is maintained to heat the material to a temperature of, say, 40 to 50° C. It is possible to advance the temperature to 60 or 70° C. or even higher in some cases, provided the time of heating is not protracted to cause objectionable precuring. While the composition is still quite moist the higher temperatures may be employed rather freely without danger of precuring. But as soon as the bulk of the moisture has departed then there arises this danger. It is better, therefore, to dry at lower temperatures, for example, around 50° C., or perhaps slightly higher, to avoid precuring difficulties. Drying at this temperature, however, might be expected to be a slow operation, since the cellulose material would be likely to hold moisture in a rather retentive manner. However, there appears to be a relation between the period of heating of the initial reaction mixture to that of drying. If the reaction is carried forward in the liquid stage, that is the initial stage, as far as is possible consistent with molding requirements, the escape of water from the composition in the dryers is more rapid than when the reaction has not been carried so far. Apparently there is a condition akin to case-hardening when the reaction has been less advanced in the liquid stage and pushing the temperature to an elevated point in order to force out the moisture only aggravates this condition and as a result by the time the product is well dried it has become precured and will not flow freely. The present invention, therefore, contemplates carrying forward to its reasonable limitations the initial heating in the liquid stage and then preferably drying at a very moderate temperature. In this way products having remarkable qualities of flow in the mold, coupled with rapid curing, are obtained.

*Avoidance of discoloring metals.*—Molded products of the character obtainable in accordance with the present invention have the advantage over those made from phenol formaldehyde resins, and the like, of their light color or colorlessness, with the resulting opportunity of the introduction of colors which will tint the molded article to delicate shades or tones, as may be required. Certain metals, however, have a strong discoloring effect, iron being the principal offender. The reaction preferably should be carried out in glass or enamel vessels or in those made of aluminum, Monel metal, or similar non-discoloring metals. In drying, as indicated, Monel metal screens, and so forth, of a kind which will not cause discoloration preferably should be used.

*Cooling the reaction mixture.*—On the large scale a reaction receptacle may be provided with a coil through which a heating or cooling fluid may be introduced. For example, steam may be passed through in order to heat the mixture and then, if the reaction becomes too violent, cold water may be passed through these same coils to check the turbulence of the reaction.

*Incorporation with cellulose.*—As stated in several of my prior applications, cellulose in its various forms may be employed, including the crude form, such as ground wood or wood flour, and more purified forms of cellulose, such as paper, cotton flock, linters, and the like. A suitably purified form of paper is alpha cellulose in sheet form. In incorporating cellulose with the syrup care should be taken to have present enough water to permit all the fibres of the cellulose to be well impregnated with the solution. Preferably the syrup, diluted with water or undiluted, as the case may be, is mixed while hot with the cellulose. The latter preferably is also heated prior to introduction into the syrup. Thorough impregnation is important in order to secure that change in the character of the cellulose which results in the production on hot pressing of translucent articles.

*Impregnation by a vacuum and pressure.*—Impregnation of cellulose fibre may be conducted by a vacuum and pressure process, that is, the fibre as such or in paper form or otherwise is placed in a closed receptacle and the air withdrawn to produce a high vacuum. The urea resin impregnating syrup then is run into the receptacle and pressure is applied. In this way the fibres are better impregnated. This is desirable in particular, when paper of some thickness is used. Impregnation adequate to fill the canals of the fibres in a substantially complete manner tends to yield the highest degree of transparency or translucency in the finished molded article or laminated sheet. A vacuum of, for example, 20–25 inches or thereabouts of mercury may be employed followed by a pressure of 50–100 lbs. or higher, as desired.

*Introduction of coloring materials.*—Owing to the colorless character of the product if made according to the foregoing directions, only a small amount of a dye is required to create a strong coloring effect. For example, from a half gram to one gram of a dye such as rhodamine suffices to strongly color from 5 to 10 kilos of the composition. Soluble dyes may be added to the syrup before it is reacted with the cellulose material. Mineral pigments may be incorporated with the dried composition during ball mill grinding, if this step is carried out. When the syrup has been made with the aid of thiourea or similar sulphur resins, care should be taken not to use a pigment which reacts with sulphur to cause an undesirable change in color.

*Drying the composition.*—If the filler is in sheet form as, for example, alpha cellulose, impregnation may be conducted, for example, by passing the dry sheets through the hot syrup. If the cellulose is in loose fibrous form, it is stirred thoroughly with the hot syrup and the product in either case is preferably dried at a temperature ranging from 40–75° C., the manner which I have already indicated being suitable. In Serial 689,165 (page 7, line 3 from bottom) I have proposed drying at room temperatures and at higher temperatures ranging from 50–60° C. In the same application vacuum drying up to 50° C. is disclosed (page 24, line 18). In some cases higher temperatures are employed as, for example, (page 24, line 15) drying is carried out in a vacuum dryer. In that particular instance, however, the overcuring resulted under the conditions of preparation of the material. Clear glass-like material has been obtained by vacuum drying up to a temperature 90° C. (Serial 689,165, page 23, line 7). With an asbestos fibre filler (same specification, page 24, line 9) vacuum drying up to 90° C. was employed. Drying has been carried out by exposure at 90° C. in a vacuum dryer for one hour, until the mass had a crisp and brittle feel. In the latter instance the syrup was incorporated with a mixture of wood flour and titanox, or titanium oxide.

*Grinding the composition.*—When a composition is required which is to be pressed in a plunger mold or used for pressure-casting, preferably it should be ground fairly fine, or at least the coarse lumps of matted material coming from the dryer should be broken up. A suitable procedure is to place the dried charge in a ball mill, which has no interior parts of iron or other discoloring metal, and grinding until the composition has been reduced to a stage of fineness such that it will pass a 40 mesh sieve. A good determination of the degree of drying can be secured by a preliminary test in a small way in a ball mill. If drying has been carried through to a stage where the product has a crisp feel, grinding will take place readily and the product, other things being carried out properly in accordance with the foregoing, will mold nicely. If the drying has been inadequate, the moisture present may tend to cause lumping and imperfect grinding. In such case the material should be placed again in the dryers and the moisture removed. The quality of grinding, therefore, is to a very considerable extent an index of the degree of drying and when one is inexperienced in making the material and cannot judge readily by the feel of the dried composition whether or not it is sufficiently moisture-free, a ball mill test may be employed. While I have specified a product passing a 40 mesh sieve, I may employ finer or coarser gradations, as desired. Of course, when the product is to be handled in sheet form grinding will not be required.

*Introduction of mold lubricant.*—During the grinding pigments and mold lubricants may be introduced. For light colors a suitable mold lubricant is zinc stearate, although other insoluble metallic soaps such, for example, as aluminum palmitate, may be used in certain cases. In general, however, a metallo-organic lubricant should be used which has no discoloring effect and zinc calcium or magnesium soaps in finely powdered or precipitated form may be used advantageously. From one-half per cent to one per cent of zinc stearate may be added to the charge in the ball mill. Other mold lubricants, such as stearic acid, wax, and the like, may be employed in special cases. For reference to the use of mold lubricants see Serial 742,719 (page 5, third paragraph). Introduction of metallic soaps tends to reduce translucency. In some cases 2 or 3 per cent or more of zinc stearate may be added to yield an opaque molded product which may be given a tint to resemble ivory. However, translucency is a highly important property and any additions which tend to reduce it are undesirable. For this reason metallic soaps if used should be employed in minimum amounts so as to impair translucency as little as possible.

*Molding pressures.*—The composition then is ready for molding, which may be conducted by means of charging the material into the cavities of plunger molds and submitting to hot-pressing. In molding the compositions of the type specified herein I find a certain range of pressures yields shaped products of good definition and surface finish. Serial 689,165 (page 13, line 19) specifies a pressure of 1,000 lbs. or higher (ranging to 3,000 lbs.; see page 24, line 21; note also Serial 28,505, page 13, line 1). This same range has been referred to as "a pressure of one thousand to two or three thousand pounds." The precise pressure selected within this preferred range will depend on the flowability of the composition. Thus in Serial 735,600 (page 3, line 13) a pressure of 2,000 lbs. is used in an illustrative example, while in Serial 742,719 (page 5, line 11) 3,000 lbs. is used illustratively for forming laminated sheets. The preferred pressure range therefore extends from one ton to one and one-half tons per square inch of mold surface and this pressure should ordinarily be indicated by a gage on the press. There are conditions where a departure from this preferred range may be required, especially in the direction of higher pressures for certain resistant compositions, particularly those having a high content of special fillers.

*Temperature of molding.*—Unlike phenol formaldehyde resinous plastics which are capable of being subjected to relatively high temperatures without disturbance, the molding compositions made with the urea type of resins are notably sensitive to temperatures above a certain relatively low limiting point. In order to cure phenol formaldehyde resinous compositions as rapidly as possible, it has become customary to mold at fairly high temperatures, ordinarily too high for the urea resin plastics. As a result of the technique which has developed in the phenol formaldehyde plastics, operators familiar therewith are liable to overheat the urea resin plastics and condemn them because of the surface imperfections resulting from such overheating. Throughout my earlier applications I have pointed out the danger of blistering and disintegration unless the molding operation was carried out below such limiting or maximum temperatures. On the other hand, curing is too slow when molding is carried out at an inordinately low temperature. Moreover the rate of transmission of heat to the mold should be considered. Temperatures registered by electrically heated platens usually should range between 100° or 110° C. up to about 150° C. A good optimum temperature range is between 125° and 140° C. In molding with steam heated platens the transmission of heat is usually slower and misleading results are returned if the assumption is made that the temperature of the mold when steam is used as the heating agent is equivalent to that represented by the steam pressure on the supply line. The temperature of the mold in these conditions is usually substantially lower. In Serial No. 689,165 (pages 23 and 24) I refer to molding between 110–130° C. On pages 13 and 14 temperatures from 125–150° C. are used. A temperature of 120° C. has also been used in certain cases; in another instance 130° C. is used as a maximum for products in which whiteness or lightness of color is to be effectively preserved; while elsewhere a temperature of 150° C. has been used. Likewise in the production of laminated material, as set forth in Serial 742,719, temperatures of 120–130° C. are recorded (pages 5 and 6). See also Serial 28,505.

*Avoidance of blistering.*—I call attention to the effect which the presence of cellulose imparts of greatly reducing blistering tendencies. Therein I note the manner in which the introduction of wood flour (with or without a white pigment or other pigment material) reduces the tendency to blistering. This and other effects which have been previously recorded by me indicate an action by the cellulose material to be something more than that solely of the role of a mere extending agent or filler.

If mechanical water is well removed from the composition by carefully drying up to, say, 65–75° C., a substantial proportion of cellulose (at least 25 per cent of the composition) has been used and the preferred maximum of 150° C. molding temperature is not exceeded, blistering difficulties are unlikely. Water which may be present in the mold and become converted into steam with formation of blisters is in part due to the reaction of condensation which may liberate water during the thermo-setting. Such water may be termed latent water. While mechanical water may be removed by drying, the latent water liberated in the mold cannot be readily freed from the molded article except that part which is liberated near the surfaces of such articles. The cellulose material, especially hydrocellulose, is useful in absorbing latent water. Thus a hydrocellulose cellulosate which may have become considerably dehydrated during drying can become more or less rehydrated during hot pressing due to absorption of latent water of condensation. This, therefore, in a sense is merely a transfer of water.

*Breathing the mold.*—When a composition contains more than a certain proportion of mechanical water, molding will be difficult unless the plunger of the mold is raised once or twice during the pressing to allow the escape of steam. This is especially noticed in the case of urea resin alone, without thiourea condensation products. The step of releasing the mold in this manner is termed "breathing the mold". It is not a desirable step, since it constitutes one more operation to receive attention and should be avoided if possible.

*Spraying with water.*—On the other hand, there are certain cases where the addition of water is helpful in improving flow. Compositions which have been overheated during the drying, or for other reasons do not flow freely, may sometimes be improved in flowing qualities by very slightly moistening with water as, for example, by atomizing water into the pulverized material while the latter is being agitated. In this way a rather low grade product may be obtained which can be used for purposes not requiring a high quality product. It should not be inferred from this statement, however, that such a procedure of moistening is desirable. It is only a makeshift which sometimes can be employed.

*Duration of curing in the mold.*—The curing time should be rendered as brief as possible. For thin moldings a molding time of from 2 to 5 minutes is desired. For thicker articles up to 10 minutes, or even longer, may be needed. The composition, therefore, shoud be as heat sensitive as is feasible consistent with adequate flow. Sometimes it is desirable to add to the composition a catalyst which will speed up the curing time.

*Curing catalysts.*—As noted in the foregoing, acceleration of curing by the addition of catalysts sometimes may be required. These may be direct acting, that is capable of exerting acceleration of reaction at all times, or they may be latent, that is active only when a given temperature is reached. I have noted that rapidity of molding is a very important consideration owing to the high labor cost of such manipulation. Hence any procedure which will shorten the time the composition is taking its final shape in the mold is of importance. With white articles sensitive to higher temperatures than those specified, the duration of molding may be adjusted or accelerated by the presence of an acid catalyst present in an amount adequate to meet the particular requirements. Likewise in Serial 689,165 (page 11; see also Serial 28,505, page 10, second paragraph) I have pointed out that sometimes it is desirable to carry out the initial reaction between urea and formaldehyde, paraform or other aldehyde employed, in an alkaline medium to the point where particles begin to precipitate and that instant to arrest the action by the addition of acetic or other acid to approximate neutrality. If the alkali is allowed to react beyond a certain point the reaction batch may solidify to a magma or white pasty substance which cannot be used advantageously for casting, although it may be dried out and used in hot-pressing. Therefore, before the liquid starts to thicken with separation of the reaction product, it is neutralized. Thereupon an acid catalyst may be added in such proportion, with or without cooling, as may be desired with reference to the speed of setting. Citric and oxalic acid, phthalic anhydride and other acid bodies mentioned in my prior applications may be used for the purpose. In some cases urea phthalate, and the like, may be employed. As latent catalysts there may be mentioned some of the amine hydrochlorides, also various salts of alkyl sulphuric acid, e. g., sodium or barium ethyl sulphate which decomposes at 120° C. into ethyl alcohol and sodium bisulphate. The latter is an active accelerator of hardening. The proportion of catalyst may range from less than 1/100 of a per cent up to several per cent. In some cases fluxing catalysts may be used, that is bodies which tend to have a fluxing effect in the first instance and then as the temperature of the mass in the press increases a breakdown occurs with liberation of catalytic material.

*Translucency.*—A very important feature of articles made from cellulose and these urea condensation products is their translucency. This is a quality which hitherto has been difficult to secure in non-inflammable plastic material of relatively low cost. Translucency may be aided by thorough incorporation of cellulose and the urea syrup, preferably allowing adequate time for the hot solution to react with the fibre. Drying, moreover, should be thorough. Mineral pigments should be absent, in their place soluble dyes being used. As already noted under lubricants, the presence of more than a very small percentage of zinc stearate tends to decrease the translucency. Another method of improving translucency is to use fairly high pressures during molding, as, for example, 2,000—3,000 lbs. Higher pressure possibly brings about further reaction between cellulose and the urea material to form more fully reacted cellulosates, thereby increasing translucency.

*Opacity.*—On the other hand, when opaque products are desired the addition of a few percent of a mineral pigment suffices. If a white article is desired a number of the white mineral pigments are available, particularly those which are not discolored by sulphur (this consideration applying if a sulphur resin is present). Pure titanium dioxide, or its commercial embodiment known as titanox, is a useful white pigment and may be used in conjunction with the cellulose in various proportions. Lithopone is even better in some respects. In no case does it appear necessary to employ more titanox than corresponds to equal proportions by weight of this titanium pigment and cellulose. In the majority of cases a considerably lower proportion of the mineral pigment suffices. This is notably true when the pigment possesses a strong pigmenting power.

*Molding then baking.*—I have disclosed the step of hot molding, followed by a baking or stoving treatment. The composition can be given a preliminary rapid molding and the shaped article in a semi-cured condition is then placed in an oven and subjected to a baking temperature, for example, 100° C., for a period of two or three hours. This brings about a further hardening and increased resistance to water. In other cases a milder heat may be employed, as set forth in Serial 742,719 (page 9, third paragraph). Thus molded articles or pressed sheets may be baked at a temperature, for example, of 60-70° C. for half an hour or longer, depending on the thickness of the pressed product. A baking range of 60-100° C. is therefore permissible, but care should be taken that the baking oven is not too hot when the semi-cured articles are first placed therein, otherwise warping may ensue. The danger of warping is reduced with the degree of hot pressing. That is, if curing has advanced to a very considerable extent in the mold, warping in the baking oven is not likely to occur. Therefore the most careful watch should be taken with only slightly cured pressed articles, as these are more sensitive to warping and therefore will require initially a correspondingly lower baking temperature.

*Laminated sheets or masses.*—By hot-pressing sheets of impregnated paper or pulp, laminated sheets or other articles may be produced. Procedures of this character have been fully described in my co-pending application Serial 742,719. In that specification I have described how thin paper, such as tissue, parchment, rice paper, crepe paper and a calendered paper known as glassine, commercially used in the manufacture of envelopes displaying the address through an aperture on the face thereof.

The laminated material may take the form of plain pressboard or by using alternating layers of different colors a thick sheet or block may be built up which if desired may be cut into various shapes, the cut edges of which will show alternating colors.

In making the laminated material it is possible also to insert photographs or pictures which, provided the pressing is carefully done, may be embedded in the sheet and thus protected.

In other cases metal flakes or powder such as gold flakes or aluminum powder may be scattered through the laminations. Again strips of the treated paper may be wound on a mandrel to form a cylinder, cone, and the like, and the mass subsequently pressed in the manner to be described.

A particular feature of the present invention is the production of sheets which even though of considerable thickness will transmit light. Thin layers are practically transparent and the thicker layers are of an opaqueness ranging from that of frosted or ground glass to a higher degree of opacity.

In one form of the invention I may take clippings or shreddings of the treated tissue or other paper and compact them by hot pressing to produce a striated molded article, sheet or block. When these clippings are made from paper that has been dyed in different colors, a multi-colored effect is obtained by mixing the shreddings of different colors and hot pressing.

Furthermore, it is possible to take portions of the shreddings and place in different parts of the mold so that the colors in a given sheet, block or molded piece will be segregated.

In carrying out the molding or hot pressing of such material, the shreddings may first be tableted if desired and then molded at the requisite temperature. The molds may have surfaces which give an embossed effect or print in raised or depressed letters any desired name or emblem. In some cases fillers may be incorporated with the paper sheets.

*Veneering.*—In the same category as lamination are included veneered products made by hot-pressing a facing on a heavier or stiffer backing or support. The latter may be, for example, wall board in any of its forms or other thick supports of pulp, and the like, including slate, glass, wood, but in particular any material capable of withstanding the mechanical and temperature stresses arising in the operation. Sheet metal or other metal supports may be used in some cases. The support frequently is a plastic of itself and may, in some cases, be of the urea resin type. Thus a plastic may be made from urea resin or urea-thiourea resin, or other modifying resin, incorporated with a relatively high proportion of wood flour, wood raspings, wood chips, sawdust, or mixtures of these. Preferably I employ in such backing composition at least 50 per cent of the cellulosic material and more often from 60 to 80 per cent thereof. I have been able to use wood flour made from soft wood in the proportion of 75 per cent of the latter to 25 per cent of the resin solids and have, in some cases even exceeded that proportion. When hard wood of greater density is used, even higher proportions are possible. Using a light colored wood flour, the resulting molding, if pigment has not been added, will normally be of a brownish color, more or less translucent. The high proportion of cellulose usually does not permit the complete disappearance to the eye of any fibres, a few of these showing after the reactions of hot-pressing have rendered infusible or converted the major portion of such fibrous material. Thus for such backings I preferably increase the percentage of fibre beyond the absorption point, that is, the point where fibre under hot-pressing ceases to be readily absorbed, dissolved or reacted by or with the urea plastic binder.

Using such material as the backing, I may provide a surfacing material consisting of a number of sheets of impregnated tissue paper prepared, for example, as set forth in Serial 742,719, or I may use a single rather heavy sheet of light colored cellulose, such as alpha cellulose. The thickness may be as required according to the desired depth of veneer. The sheet of material may be suitably colored by means of dyes or pigments. On its upper side a very small percentage of zinc stearate may be included in order to allow the pressed surfaces to be readily released from the mold. The well-dried sheeting suitably prepared, while hard and crisp at room temperature, shows plasticity at, say, 60° C., so that the sheets can be bent over shaped pieces or rounded or bevelled edges of a support. When the supporting structure is of steel and adhesion thereto is desired, the steel or other metal therefore should be well cleaned. Zinc stearate or other mold lubricant preferably should not be present on the under side of the impregnated paper which is to contact with the metal form or support.

*Veneering procedure.*—Different steps may be adopted, depending on the precise result desired. In one case, for example, impregnated alpha cellulose in sheet form is laid in the bottom of a flat mold, e. g., a panel mold, and over this is spread to considerable depth a backing composition in powdered form made from urea resin (or urea-thiourea resin) and ground wood in high proportion. The mold cavity thus having been filled with the charge, hot-pressing is conducted to weld all together. In this way a backing perhaps $\frac{1}{8}$ to $\frac{1}{4}$ inch in thickness may be surfaced with a veneer $\frac{1}{32}$ to $\frac{1}{16}$ inch in thickness. The alpha cellulose or sulphite fibre sheet may, as indicated, be tinted to any desired color and if dyes are used instead of mineral pigments the result is a decorative translucent veneered effect wholly covering the brown colored, but strong and rigid backing. Such veneered sheets, panels, and other shapes, may be made relatively cheaply and have many prospective uses.

Another method of veneering is to place the powdered composition in the mold and hot-press to form a partially cured backing. On this place a sheet of alpha cellulose and again press to complete the curing of the backing and to cement the cellulose veneer in place. When desired, special designs may be prepared by cutouts of different shapes which can be laid on the surface of the backing to fit nicely as, for example, like parts of a jig saw puzzle and when these multi colored pieces of the veneer or material are pressed there may be obtained various futuristic or other designs as desired.

Tiles suitable for bathrooms, and the like, may be made in this way or by any other veneering procedure within the scope of the present invention.

*Shaped veneer.*—It is proposed to manufacture various bulky articles, such as lamp bases, urns and heavy decorative bodies, chair backs, arms, rungs, legs, and other furniture parts or requirements, bathroom equipment, and so forth, by preparing a shaped base or form of relatively cheap material and laying over this an impregnated sheet as described above, suitably colored. The sheet is warmed sufficiently to become plastic so it may be bent or wrapped about all or such part of the form as is required. Then the wrapped form is placed in a hot-press having a mold to correspond and the veneer is thereby pressed and shaped into place to conform to the base and to give the latter a decorative finish.

*Plunger veneering.*—This step may be illustrated by the method of covering a tapering chair leg, square in cross section, with a veneer of plastic composition as aforesaid. A mold cavity is provided slightly larger than the chair leg and the molding composition placed therein.

Then the leg is forced into the composition while the latter is being heated, thereby to form a veneering finish.

*Extrusion.*—Rods, tubes, chair legs and rungs, pipes for liquids, and the like, may be prepared by extrusion downward from a suitable die of the foregoing plastic. This treatment may be followed by cautious baking, if desired.

*Fluxing.*—For extrusion purposes or possibly in other cases, when a more plastic material is required, there may be added various fluxes, such as glycerine, glycol, diethylene glycol, and so forth. In some cases the addition of 2 or 3 per cent of thiourea in the charge when it is being ground in a ball mill serves to bring about adequate fluxing.

*Incorporation of other resins and plastic bodies.*—In the foregoing I have referred to various modifying resins, such as phenol aldehyde resin, acetone aldehyde resin, sulphur phenol resin, and others. Various proteids, as indicated in my prior applications, may be used as modifying agents, including casein, glue and gelatine, irish moss, algin, albumin, dried blood, and the like. These may be used in all proportions and therefore it is not necessary to set forth any specific formula. Vinyl resins, being capable of production of a light color, may be used in some cases with the light colored urea resins to yield various products such as those described above in which the vinyl resin exerts a modifying influence. By urea resin I include also urea-thiourea resin, and the like.

*Water resistance.*—Tiles and many other articles, such as bathroom equipment, must exhibit water resistance and for this purpose it is desirable to use thiourea in conjunction with urea. The higher the proportion of thiourea the more positive the water resistance. It is, however, not necessary to go beyond a certain proportion in order to secure sufficient water resistance for all practical purposes. Thiourea is more costly than urea and therefore should be used in as low a proportion possible consistent with meeting commercial requirements. Even as low as 1 part of thiourea to 9 parts of urea has a considerable influence on the action of moisture. While a composition made from urea formaldehyde resin alone will give molded articles which in the course of time lose their glossy finish, due to action of moisture, the same compositions in which, however, thiourea has replaced the urea to the extent of 10 to 20 per cent hold the finish in much more durable manner. For most purposes a proportion of 1/3 thiourea to 2/3 urea is the maximum required of this more expensive ingredient.

*Printing blocks.*—Using the plastic of the present invention I may make printing blocks or printing plates which may be molded directly from the original as a matrix. Such molded printing blocks may, if necessary, be hardened further by baking. Such blocks may be required to stand pressures of 450 lbs. per square inch. Type metal will stand only about 300 lbs.

A considerable number of illustrations are hereinafter given in which the same ratio of urea, thiourea and formaldehyde is maintained. This is illustrative in that it affords a desirable basis for comparison. However, by using these stated proportions for comparative purposes I do not wish thereby to limit myself either to proportions or to the precise character of the raw materials, it being understood that I may make combinations and additions in various ways and with various materials within the scope of the invention.

In the illustrative examples the proportions given are parts by weight.

*Example 1.*—Urea 840 parts, thiourea 300 parts, aqueous formaldehyde solution (formalin) 2400 parts. The solution contained 37.1 percent actual formaldehyde and was used in practically neutral form with pH 5.6.

The urea and formaldehyde solution was mixed in the cold and heated under a reflux condenser to boiling point. Boiling was continued for 10 minutes, the temperature under these conditions being approximately 97.5° C. At the end of 10 minutes the thiourea was added and the boiling continued for a total period of 30 minutes. The hot solution was poured onto 730 parts of wood flour (the latter passing 20 mesh sieve). After being well mixed the wet mass was dried by spreading out on screens of Monel metal placed in a drying chamber through which a gentle current of air was passed, the temperature ranging from 30° up to 52° C. Drying was continued until the lumps of the material had a brittle feel and could be readily crushed or ground in a ball mill. At this stage drying was considered complete and the batch was placed in a ball mill where it was ground for a period of about 1 hour until fine enough to pass a 40 mesh sieve.

This molding composition was then tested for its molding properties by conducting pressings at 1500 lbs. pressure per square inch and temperatures of the mold ranging from 100 to 130° C. The product possessed an extremely good flow and yielded light brown shaped articles of a very attractive translucent appearance. Some of these specimens were pressed only to a semicured stage and then were baked for 3 days at a temperature of 65° C.

*Example 2.*—The same proportions of raw materials were followed, the pH of the neutral formalin solution being 5.4 and the reaction at the boiling temperature being continued for a total of 45 minutes. 1280 parts of wood flour of relatively long fibre were used. This product after drying and grinding in the ball mill was found to mold nicely in the hot press at a temperature of 115° C. employing a curing time of 6 minutes and a pressure of 1500 lbs. Some of the specimens made in this way were subsequently baked at 65° C.

*Example 3.*—This molding composition contains a much higher proportion of wood flour. The conditions were much the same as in Examples 1 and 2, the same quantities of raw materials being used, the formaldehyde solution having a pH of 5.23 and the boiling being carried out for 30 minutes. The clear syrupy solution thus obtained was mixed with the wood flour and drying and grinding carried out in the same manner. The flow of this composition was not quite as free as that observed in the case of Examples 1 and 2, but was adequate and enabled fairly good molded specimens to be obtained by hot pressing at 115° C. under a pressure of 1500 lbs.

*Example 4.*—Using the same quantities of urea, thiourea and formaldehyde solution, the latter being in the zone of neutrality with a pH of 5.3. A reaction period of boiling for 50 minutes yielded a syrupy solution which was divided into three parts. To one part there was added 10 per cent of wood flour based on the total solids in the solution. To another portion there was added 25 per cent of wood flour, while the third portion received no addition of wood flour. These three portions were all dried in a vacuum oven at a temperature of about 70° C. until sufficiently dry for molding. After drying and grinding, pressing tests were conducted to determine which portion cured to best advantage. It was found that without the cellulose (wood flour) material the resin was too easily liquefied and too slow in curing to be employed easily in molds having normal clearances. On hot pressing the resin exuded from the mold to such an extent that the production of a good molded specimen of the required dimensions was impossible. The portion containing 10 per cent of cellulose molded to better advantage, showing much less exudation and moderately good curing properties. There was, however, a slight degree of blistering observed. The portion containing 25 per cent of cellulose cured nicely in the mold without blistering and furnished excellent molded specimens.

*Example 5.*—The same quantities of urea, thiourea and formaldehyde solution were used as in Example 1, the pH of the formaldehyde solution being 5.3 and the boiling period of reaction being 25 minutes. With the same quantities as employed in Example 1 the resulting syrup was used to impregnate 812 parts of alpha cellulose in sheet form. This was carried out by passing the sheets through the solution. Prior to such immersion a small amount of dye, namely ½ part of rhodamine, had been added to the syrup thereby causing the cellulose sheet to become dyed a strong pink. Approximately 1600 parts of the finished sheet stock was thus derived.

*Example 6.*—In Example 5 the alpha cellulose sheet in dry form was impregnated with the syrup. In the present example the alpha sheet was first pulped in water and the syrup and pulp mixed. The formaldehyde solution used had the same pH value as in Example 5 and the boiling period was 30 minutes. It was noted that the pH of the paper pulp was 7.8 when it was mixed with the syrup. A very different product was obtained when the pulped material was thus incorporated with the syrup. On drying a product of a flocculent character which proved difficult to grind in the ball mill owing to its more spongy or stringy character was obtained. From the standpoint of ease of grinding, therefore, it is better to impregnate the cellulose stock when it is dry rather than when it has been first converted into a pulp with water. Aside from the somewhat greater difficulty of grinding, there is the further possibility that a highly flocculent or voluminous material is not as easy to mold. The amount of charge which can be placed in a given cavity is less and larger molds, therefore, have to be constructed. Densification of the molded material, therefore, is desirable and if this can be secured as a part of the normal manufacturing procedure the extra step of tableting is avoided, at least in the majority of cases. Of course, when a multi-colored molded article is required which is to be secured by placing in the mold tablets of different colors, the procedure of preforming or tableting may be utilized.

*Example 7.*—The alpha cellulose stock dries rather slowly when made in accordance with the procedure of Example 6. To shorten the time of drying the reaction mixture was boiled for a total period of 50 minutes. It was then found to dry in approximately half the time required when the reaction was carried on for only 25 or 30 minutes.

*Example 8.*—A batch of syrup was made in a manner similar to Example 6, but the boiling was carried on for 80 minutes to form a more viscous syrup. A portion of the syrup was withdrawn and used for the impregnation of alpha cellulose. 130 parts of this stock were used to absorb about 400 parts of the syrup, thereby taking up in the fibre approximately 260 parts of the resin on a dry basis. The remaining portion of the syrup was boiled until the total time of heating was 100 minutes. A sheet of alpha cellulose 52 parts absorbed 160 parts of the reaction mixture, calculated on dry weight.

*Example 9.*—Using 840 parts urea, 300 parts thiourea and 2400 parts of formalin, the pH of the reaction mixture being within the neutral zone, namely, 5.3, the reaction was carried through a period of 50 minutes total time of boiling. A small amount of sulphur rhodamine dye was added and alpha cellulose sheet stock was run through the hot syrup. The absorption which took place yielded an impregnated material containing approximately 33 per cent of cellulose. This was dried slowly between 40° and 50° C. until hard and crisp.

*Example 10.*—The weights used were the same as in Example 9, but the formalin was diluted with 6½ volumes of water. The pH value was 6 and the boiling conducted for 60 minutes. 800 parts of wood flour having a long fibre were used to yield (calculated on the dry weight) approximately 75 per cent of the cellulose material. When this had been thoroughly dried a small amount of zinc stearate was added and thoroughly mixed in a ball mill. Grinding in the ball mill was not as complete as when fine wood flour is used, because the longer fibered material is more elastic and springy. This material was found to mold well under hot-pressing at 125° C. When molded at 3,000 lbs. pressure a good bit of reaction seemed to take place in the mold with the resulting absorption, solution or disappearance of fibre. Increasing the pressure under these circumstances aids such conversion or apparent change and the pressure, if desired, may be raised to 4,500 lbs. or higher in order to favor the change.

*Example 11.*—A sheet of the impregnated alpha cellulose according to Example 9 was placed in the bottom of a mold and the high cellulosic product of Example 10, in powdered form, was charged into the mold above this sheet. On hot-pressing a rigid, panel-like product was secured, the thick and rigid backing of which was of a brownish color while the face was of a clear, translucent, pink shade.

*Example 12.*—840 parts urea, 300 parts thiourea and 2250 parts formalin solution were used. In this case note that the proportion of the latter is reduced over that employed in the previous examples. The pH was 7.2 and the boiling conducted for 30 minutes. A fine grade of wood flour was incorporated with the syrup to yield approximately 36 per cent cellulose material based on the dry weight. On drying overnight at about 60° C. a crisp product was obtained which ground readily in the ball mill. Prior to drying, however, the batch was separated into two parts, to one of which was added a solution of barium ethyl sulphate equivalent to approximately 1½ per cent of the dry weight.

The product containing the latent catalyzer when molded at 140° C. and higher gave shaped articles which showed excellent resistance to boiling water. A product of this kind can be used to make various molded articles as such or employed as a backing or support for cellulose sheet veneer.

*Example 13.*—The same proportions and quantities were used as in Example 12, with the addition of 10 parts of light magnesium carbonate. The initial pH was 7. On heating gradually over a period of 10 or 12 minutes the pH was found to be 8.4 (the temperature then registering 65° C.). A boiling temperature was reached in 17 minutes, the pH registering 7.8. Thiourea was added and this required about 10 minutes to dissolve, being completely in solution 37 minutes from the time of starting the heating. The pH recorded at that time was 7.7. At the end of another 10 minutes, or 47 minutes in all from beginning of heating, the pH registering 7.6, 1,000 parts of fine wood flour were added. The composition was dried, ground in a ball mill with the addition of a small amount of zinc stearate. This composition was found to flow extremely well on hot-pressing. A portion of the product treated in the ball mill was moistened with water (with and without addition of catalyst), and dried. The product was found to have agglomerated into granules of notably greater density and compactness than the material coming from the ball mill. This granulated product is useful in molding operations where a substantial charge, without undue bulk, has to be introduced into the mold.

*Example 14.*—The syrupy products obtained in the course of preparation of the foregoing compositions may be used as a glue for cementing wood veneer to its support, or for making laminated wood products. Thus the syrup obtained in Example 13 may be applied to one side of the sheet or veneer and this sheet glued onto a wooden support. In this way, while the veneered surface is wood, nevertheless the urea composition forms a part of such veneer and therefore is included within the scope of the present invention.

What I claim is:

1. A shaped plastic backing of urea resin and cellulose composition, the amount of cellulose being above the absorption point, faced with a urea-resin cellulose composition in which the amount of cellulose is below the absorption point.

2. A shaped plastic backing of urea resin and cellulose composition, the amount of cellulose being above the absorption point, faced with a urea-resin cellulose composition in which the amount of cellulose is below the absorption point, the urea resin in the entire mass being cured.

3. A shaped plastic backing of urea resin and cellulose composition, the amount of cellulose being above the absorption point, faced with a urea-resin cellulose composition containing a fluxing agent for the resin, the amount of cellulose in the facing being below the absorption point.

4. A shaped plastic backing of urea resin and cellulose composition, the amount of cellulose being above the absorption point, faced with a substantially water-resistant urea-resin cellulose composition in which the amount of cellulose is below the absorption point.

5. A shaped plastic backing of urea resin and cellulose composition, the cellulose being above the absorption point, faced with a urea-thiourea aldehyde condensation product and cellulose composition, the amount of cellulose being below the absorption point in the facing composition.

6. The method of veneering articles of manufacture which comprises applying thereto a molding composition of urea resin and a latent curing catalyst, and heat treating the resulting article to cure the composition.

7. The method of molding urea resins which comprises heat treating a urea-resin composition containing a latent curing catalyst at a temperature at which the composition hardens rapidly but below that at which substantial blistering appears.

8. The method of molding urea resins which comprises preparing a urea-resin composition containing a latent curing catalyst and heat treating the composition under superatmospheric pressure to cure it.

9. The method of making veneered molded articles which comprises heating under pressure superposed layers of urea-resin compositions containing cellulose, one of the layers of composition containing an amount of cellulose above the absorption point and another layer containing cellulose below the absorption point, whereby a faced article is obtained of desirable surface finish.

10. The method of making veneered articles which comprises applying to an article of manufacture, a urea-thiourea-formaldehyde resin composition containing alphacellulose and a curing catalyst of organic chemical character which liberates an acid during hot pressing, said acid acting to catalyze the conversion of the resin composition into a hardened body, and heat treating the coated article to produce a hardened urea resin veneer thereon.

11. The method of heat treating urea resins which comprises preparing a composition containing urea-formaldehyde resin and alphacellulose and a curing catalyst of organic chemical character which liberates an acid during hot pressing, said acid acting to catalyze the conversion of the resin composition into a hardened body, and heat treating said composition to produce a hardened urea resin product.

CARLETON ELLIS.